(12) United States Patent
Flood et al.

(10) Patent No.: US 10,003,379 B2
(45) Date of Patent: Jun. 19, 2018

(54) WIRELESS COMMUNICATION WITH PROBING BANDWIDTH

(71) Applicant: Starkey Laboratories, Inc., Eden Prairie, MN (US)

(72) Inventors: Stephen Paul Flood, Eden Prairie, MN (US); Jeffrey Paul Solum, Shorewood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 142 days.

(21) Appl. No.: 14/270,949

(22) Filed: May 6, 2014

(65) Prior Publication Data
US 2015/0326274 A1   Nov. 12, 2015

(51) Int. Cl.
| | | |
|---|---|---|
| *H04B 1/00* | (2006.01) |
| *H04B 1/7143* | (2011.01) |
| *H04B 17/00* | (2015.01) |
| *H04B 1/715* | (2011.01) |
| *H04W 72/02* | (2009.01) |

(52) U.S. Cl.
CPC .......... *H04B 1/7143* (2013.01); *H04B 1/715* (2013.01); *H04B 17/006* (2013.01); *H04W 72/02* (2013.01); *H04B 2201/71346* (2013.01)

(58) Field of Classification Search
CPC .... H04B 1/7143; H04B 17/006; H04B 1/715; H04B 2201/71346
USPC ....................................................... 375/132
See application file for complete search history.

(56) References Cited

U.S. PATENT DOCUMENTS

| | | | |
|---|---|---|---|
| 2,530,621 A | 11/1950 | Lybarger |
| 2,554,834 A | 5/1951 | Lavery |
| 2,656,421 A | 10/1953 | Lybarger |
| 3,396,245 A | 8/1968 | Flygstad |
| 3,527,901 A | 9/1970 | Geib |
| 3,571,514 A | 3/1971 | Wruk |

(Continued)

FOREIGN PATENT DOCUMENTS

| | | |
|---|---|---|
| CH | 670349 A5 | 5/1989 |
| CH | 673551 A5 | 3/1990 |

(Continued)

OTHER PUBLICATIONS

US 8,175,281, 05/2012, Edwards (withdrawn)

(Continued)

*Primary Examiner* — Tanmay Shah
(74) *Attorney, Agent, or Firm* — Schwegman Lundberg & Woessner, P.A.

(57) ABSTRACT

A system embodiment includes a first device and a second device configured to communicate over a selected wireless communication channel selected from a band of channels or over a selected set of channels used in an adaptive frequency hopping scheme. The first device is configured to transmit a probe signal that has a plurality of frequencies contained within the band of channels, and the second device is configured to determine a signal strength of the probe signal for each of a plurality of potential communication channels within the band of channels. The first and second devices configured to switch to another wireless communication channel based at least in part on the signal strength of the probe signal for each of a plurality of potential wireless communication channels.

23 Claims, 14 Drawing Sheets

(56) References Cited

U.S. PATENT DOCUMENTS

| | | | |
|---|---|---|---|
| 3,660,695 | A | 5/1972 | Schmitt |
| 3,742,359 | A | 6/1973 | Behymer |
| 3,770,911 | A | 11/1973 | Knowles et al. |
| 3,798,390 | A | 3/1974 | Gage et al. |
| 3,836,732 | A | 9/1974 | Johanson et al. |
| 3,875,349 | A | 4/1975 | Ruegg |
| 3,894,196 | A | 7/1975 | Briskey |
| 3,946,168 | A | 3/1976 | Preves |
| 3,975,599 | A | 8/1976 | Johanson |
| 4,051,330 | A | 9/1977 | Cole |
| 4,142,072 | A | 2/1979 | Berland |
| 4,187,413 | A | 2/1980 | Moser |
| 4,366,349 | A | 12/1982 | Adelman |
| 4,395,601 | A | 7/1983 | Kopke et al. |
| 4,396,806 | A | 8/1983 | Anderson |
| 4,419,544 | A | 12/1983 | Adelman |
| 4,425,481 | A | 1/1984 | Mansgold et al. |
| 4,449,018 | A | 5/1984 | Stanton |
| 4,456,795 | A | 6/1984 | Saito |
| 4,467,145 | A | 8/1984 | Borstel |
| 4,471,490 | A | 9/1984 | Bellafiore |
| 4,489,330 | A | 12/1984 | Marutake et al. |
| 4,490,585 | A | 12/1984 | Tanaka |
| 4,508,940 | A | 4/1985 | Steeger |
| 4,596,899 | A | 6/1986 | Wojcik et al. |
| 4,622,440 | A | 11/1986 | Slavin |
| 4,631,419 | A | 12/1986 | Sadamatsu et al. |
| 4,637,402 | A | 1/1987 | Adelman |
| 4,638,125 | A | 1/1987 | Buettner |
| 4,696,032 | A | 9/1987 | Levy |
| 4,710,961 | A | 12/1987 | Buttner |
| 4,712,244 | A | 12/1987 | Zwicker et al. |
| 4,723,293 | A | 2/1988 | Harless |
| 4,751,738 | A | 6/1988 | Widrow et al. |
| 4,756,312 | A | 7/1988 | Epley |
| 4,764,957 | A | 8/1988 | Angelini et al. |
| 4,780,885 | A * | 10/1988 | Paul et al. .................. 375/267 |
| 4,845,755 | A | 7/1989 | Busch et al. |
| 4,862,509 | A | 8/1989 | Towsend |
| 4,882,762 | A | 11/1989 | Waldhauer |
| 4,887,299 | A | 12/1989 | Cummins et al. |
| 4,926,464 | A | 5/1990 | Schley-May |
| 4,930,156 | A | 5/1990 | Norris |
| 4,995,085 | A | 2/1991 | Kern et al. |
| 5,010,575 | A | 4/1991 | Marutake et al. |
| 5,027,410 | A | 6/1991 | Williamson et al. |
| 5,029,215 | A | 7/1991 | Miller, II |
| 5,083,312 | A | 1/1992 | Newton et al. |
| 5,086,464 | A | 2/1992 | Groppe |
| 5,091,952 | A | 2/1992 | Williamson et al. |
| 5,157,405 | A | 10/1992 | Wycoff et al. |
| 5,189,704 | A | 2/1993 | Krauss |
| 5,204,917 | A | 4/1993 | Arndt et al. |
| 5,212,827 | A | 5/1993 | Meszko et al. |
| 5,214,709 | A | 5/1993 | Ribic |
| 5,226,087 | A | 7/1993 | Ono et al. |
| 5,280,524 | A | 1/1994 | Norris |
| 5,289,544 | A | 2/1994 | Franklin |
| 5,390,254 | A | 2/1995 | Adelman |
| 5,404,407 | A | 4/1995 | Weiss |
| 5,422,628 | A | 6/1995 | Rodgers |
| 5,425,104 | A | 6/1995 | Shennib |
| 5,426,689 | A | 6/1995 | Griffith et al. |
| 5,434,924 | A | 7/1995 | Jampolsky |
| 5,463,692 | A | 10/1995 | Fackler |
| 5,467,083 | A | 11/1995 | McDonald et al. |
| 5,479,522 | A | 12/1995 | Lindemann et al. |
| 5,483,599 | A | 1/1996 | Zagorski |
| 5,502,769 | A | 3/1996 | Gilbertson |
| 5,524,056 | A | 6/1996 | Killion et al. |
| 5,553,152 | A | 9/1996 | Newton |
| 5,581,747 | A | 12/1996 | Anderson |
| 5,600,728 | A | 2/1997 | Satre |
| 5,629,985 | A | 5/1997 | Thompson |
| 5,636,285 | A | 6/1997 | Sauer |
| 5,640,293 | A | 6/1997 | Dawes et al. |
| 5,640,457 | A | 6/1997 | Gnecco et al. |
| 5,651,071 | A | 7/1997 | Lindemann et al. |
| 5,659,621 | A | 8/1997 | Newton |
| 5,687,242 | A | 11/1997 | Iburg |
| 5,706,351 | A | 1/1998 | Weinfurtner |
| 5,710,820 | A | 1/1998 | Martin et al. |
| 5,721,783 | A | 2/1998 | Anderson |
| 5,734,976 | A | 3/1998 | Bartschi et al. |
| 5,737,430 | A | 4/1998 | Widrow |
| 5,740,257 | A | 4/1998 | Marcus |
| 5,751,820 | A | 5/1998 | Taenzer |
| 5,757,932 | A | 5/1998 | Lindemann et al. |
| 5,757,933 | A | 5/1998 | Preves et al. |
| 5,761,319 | A | 6/1998 | Dar et al. |
| 5,768,397 | A | 6/1998 | Fazio |
| 5,793,875 | A | 8/1998 | Lehr et al. |
| 5,796,848 | A | 8/1998 | Martin |
| 5,798,390 | A | 8/1998 | Weber et al. |
| 5,809,151 | A | 9/1998 | Husung |
| 5,822,442 | A | 10/1998 | Agnew et al. |
| 5,823,610 | A | 10/1998 | Ryan et al. |
| 5,825,631 | A | 10/1998 | Prchal |
| 5,835,610 | A | 11/1998 | Ishige et al. |
| 5,835,611 | A | 11/1998 | Kaiser et al. |
| 5,852,668 | A | 12/1998 | Ishige et al. |
| 5,862,238 | A | 1/1999 | Agnew et al. |
| 5,956,330 | A | 9/1999 | Kerns |
| 5,966,639 | A | 10/1999 | Goldberg et al. |
| 5,991,419 | A | 11/1999 | Brander |
| 5,991,420 | A | 11/1999 | Stern |
| 6,002,672 | A * | 12/1999 | Todd .......................... 370/252 |
| 6,031,922 | A | 2/2000 | Tibbetts |
| 6,031,923 | A | 2/2000 | Gnecco et al. |
| 6,041,129 | A | 3/2000 | Adelman |
| 6,067,445 | A | 5/2000 | Gray et al. |
| 6,067,449 | A | 5/2000 | Jager |
| 6,078,675 | A | 6/2000 | Bowen-Nielsen et al. |
| 6,078,825 | A | 6/2000 | Hahn et al. |
| 6,088,339 | A | 7/2000 | Meyer |
| 6,101,258 | A | 8/2000 | Killion et al. |
| 6,104,821 | A | 8/2000 | Husung |
| 6,115,478 | A | 9/2000 | Schneider |
| 6,118,877 | A | 9/2000 | Lindemann et al. |
| 6,144,748 | A | 11/2000 | Kerns |
| 6,148,087 | A | 11/2000 | Martin |
| 6,157,727 | A | 12/2000 | Rueda |
| 6,157,728 | A | 12/2000 | Tong et al. |
| 6,175,633 | B1 | 1/2001 | Morrill et al. |
| 6,216,040 | B1 | 4/2001 | Harrison |
| 6,230,029 | B1 | 5/2001 | Hahn et al. |
| 6,236,731 | B1 | 5/2001 | Brennan et al. |
| 6,240,192 | B1 | 5/2001 | Brennan et al. |
| 6,240,194 | B1 | 5/2001 | De Koning |
| 6,310,556 | B1 | 10/2001 | Green et al. |
| 6,311,155 | B1 | 10/2001 | Vaudrey et al. |
| 6,324,291 | B1 | 11/2001 | Weidner |
| 6,327,370 | B1 | 12/2001 | Killion et al. |
| 6,347,148 | B1 | 2/2002 | Brennan et al. |
| 6,356,741 | B1 | 3/2002 | Bilotti et al. |
| 6,366,863 | B1 | 4/2002 | Bye et al. |
| 6,381,308 | B1 | 4/2002 | Cargo et al. |
| 6,389,142 | B1 | 5/2002 | Hagen et al. |
| 6,438,245 | B1 | 8/2002 | Taenzer et al. |
| 6,449,662 | B1 | 9/2002 | Armitage |
| 6,459,882 | B1 | 10/2002 | Palermo et al. |
| 6,466,679 | B1 | 10/2002 | Husung |
| 6,466,832 | B1 | 10/2002 | Zuqert et al. |
| 6,522,764 | B1 | 2/2003 | Bogeskov-Jensen |
| 6,549,633 | B1 | 4/2003 | Westermann |
| 6,633,645 | B2 | 10/2003 | Bren et al. |
| 6,694,034 | B2 | 2/2004 | Julstrom et al. |
| 6,760,457 | B1 | 7/2004 | Bren et al. |
| 7,016,511 | B1 | 3/2006 | Shennib |
| 7,062,223 | B2 | 6/2006 | Gerber et al. |
| 7,075,903 | B1 | 7/2006 | Solum |
| 7,099,486 | B2 | 8/2006 | Julstrom et al. |
| 7,103,191 | B1 | 9/2006 | Killion |
| 7,116,792 | B1 | 10/2006 | Taenzer et al. |

(56) References Cited

U.S. PATENT DOCUMENTS

| | | |
|---|---|---|
| 7,139,404 B2 | 11/2006 | Feeley et al. |
| 7,142,814 B2 | 11/2006 | Nassimi |
| 7,149,552 B2 | 12/2006 | Lair |
| 7,162,381 B2 | 1/2007 | Boor et al. |
| 7,181,032 B2 | 2/2007 | Jakob et al. |
| 7,248,713 B2 | 7/2007 | Bren et al. |
| 7,257,372 B2 | 8/2007 | Kaltenbach et al. |
| 7,317,997 B2 | 1/2008 | Boor et al. |
| 7,369,510 B1 | 5/2008 | Wong et al. |
| 7,369,669 B2 | 5/2008 | Hagen et al. |
| 7,412,294 B1 | 8/2008 | Woolfork |
| 7,433,435 B2 | 10/2008 | Nagaraja |
| 7,447,325 B2 | 11/2008 | Bren et al. |
| 7,450,078 B2 | 11/2008 | Knudsen et al. |
| 7,529,565 B2 | 5/2009 | Hilpisch et al. |
| 7,561,707 B2 | 7/2009 | Kornagel |
| 7,583,625 B2 | 9/2009 | Bennett |
| 7,590,253 B2 | 9/2009 | Killion |
| 7,596,237 B1 | 9/2009 | Constantin |
| 7,702,121 B2 | 4/2010 | Husung et al. |
| 7,778,432 B2 | 8/2010 | Larsen |
| 7,813,762 B2 | 10/2010 | Sanguino et al. |
| 7,822,217 B2 | 10/2010 | Hagen et al. |
| 7,873,377 B1 | 1/2011 | Cocos |
| 8,041,066 B2 | 10/2011 | Solum |
| 8,169,938 B2 | 5/2012 | Duchscher et al. |
| 8,194,901 B2 | 6/2012 | Alber et al. |
| 8,208,642 B2 | 6/2012 | Edwards |
| 8,249,512 B2 | 8/2012 | Prather |
| 8,331,592 B2 | 12/2012 | Wu et al. |
| 8,340,331 B2 | 12/2012 | Pansell et al. |
| 8,380,320 B2 | 2/2013 | Spital |
| 8,442,248 B2 | 5/2013 | Solum et al. |
| 8,515,114 B2 | 8/2013 | Solum |
| 8,571,678 B2 | 10/2013 | Wang |
| 8,712,083 B2 | 4/2014 | Solum |
| 8,737,653 B2 | 5/2014 | Woods |
| 8,804,988 B2 | 8/2014 | Solum et al. |
| 8,811,639 B2 | 8/2014 | Solum et al. |
| 2001/0007050 A1 | 7/2001 | Adelman |
| 2001/0007335 A1 | 7/2001 | Tuttle et al. |
| 2002/0006206 A1 | 1/2002 | Scofield |
| 2002/0030871 A1 | 3/2002 | Anderson et al. |
| 2002/0076073 A1 | 6/2002 | Taenzer et al. |
| 2002/0090099 A1 | 7/2002 | Hwang |
| 2002/0131614 A1 | 9/2002 | Jakob et al. |
| 2002/0132585 A1 | 9/2002 | Palermo et al. |
| 2002/0174340 A1 | 11/2002 | Dick et al. |
| 2002/0186857 A1 | 12/2002 | Bren et al. |
| 2003/0045283 A1 | 3/2003 | Hagedoorn |
| 2003/0059073 A1 | 3/2003 | Bren et al. |
| 2003/0059076 A1 | 3/2003 | Martin |
| 2003/0078071 A1 | 4/2003 | Uchiyama |
| 2003/0096611 A1* | 5/2003 | Cooper ............ 455/434 |
| 2003/0133582 A1 | 7/2003 | Niederdrank |
| 2003/0181211 A1 | 9/2003 | Razavilar et al. |
| 2003/0215106 A1 | 11/2003 | Hagen et al. |
| 2003/0231783 A1 | 12/2003 | Kah |
| 2004/0010181 A1 | 1/2004 | Feeley et al. |
| 2004/0052391 A1 | 3/2004 | Bren et al. |
| 2004/0052392 A1 | 3/2004 | Sacha et al. |
| 2004/0077387 A1 | 4/2004 | Sayag et al. |
| 2004/0136555 A1 | 7/2004 | Enzmann |
| 2004/0141628 A1 | 7/2004 | Villaverde et al. |
| 2004/0190739 A1 | 9/2004 | Bachler et al. |
| 2004/0193090 A1 | 9/2004 | Lebel et al. |
| 2004/0208333 A1 | 10/2004 | Cheung et al. |
| 2004/0259585 A1 | 12/2004 | Yitzchak et al. |
| 2005/0008178 A1 | 1/2005 | Joergensen et al. |
| 2005/0058313 A1 | 3/2005 | Victorian et al. |
| 2005/0078844 A1 | 4/2005 | Von Ilberg |
| 2005/0095993 A1* | 5/2005 | Kim et al. ............ 455/78 |
| 2005/0099341 A1 | 5/2005 | Zhang et al. |
| 2005/0100182 A1 | 5/2005 | Sykes et al. |
| 2005/0160270 A1 | 7/2005 | Golberg et al. |
| 2005/0197061 A1 | 9/2005 | Hundal |
| 2005/0249371 A1 | 11/2005 | Vogt |
| 2005/0283263 A1 | 12/2005 | Eaton et al. |
| 2006/0013420 A1 | 1/2006 | Sacha |
| 2006/0018497 A1 | 1/2006 | Kornagel |
| 2006/0039577 A1 | 2/2006 | Sanguino et al. |
| 2006/0044140 A1 | 3/2006 | Berg |
| 2006/0057973 A1 | 3/2006 | Wikel et al. |
| 2006/0068842 A1 | 3/2006 | Sanguino et al. |
| 2006/0093172 A1 | 5/2006 | Ludvigsen et al. |
| 2006/0193273 A1 | 8/2006 | Passier et al. |
| 2006/0193375 A1 | 8/2006 | Lee |
| 2006/0198529 A1 | 9/2006 | Kjems et al. |
| 2006/0205349 A1 | 9/2006 | Passier et al. |
| 2006/0245611 A1 | 11/2006 | Jorgensen et al. |
| 2006/0274747 A1 | 12/2006 | Duchscher et al. |
| 2007/0004464 A1 | 1/2007 | Lair et al. |
| 2007/0009124 A1 | 1/2007 | Larsen |
| 2007/0066297 A1 | 3/2007 | Heidari-bateni |
| 2007/0080889 A1 | 4/2007 | Zhang |
| 2007/0086601 A1 | 4/2007 | Mitchler |
| 2007/0121975 A1 | 5/2007 | Sacha et al. |
| 2007/0149261 A1 | 6/2007 | Huddart |
| 2007/0153745 A1 | 7/2007 | Sun et al. |
| 2007/0197206 A1* | 8/2007 | Olson ............... H04L 12/2697 455/423 |
| 2007/0230727 A1 | 10/2007 | Sanguino et al. |
| 2007/0248237 A1 | 10/2007 | Bren et al. |
| 2007/0269065 A1 | 11/2007 | Kilsgaard |
| 2008/0008341 A1 | 1/2008 | Edwards |
| 2008/0013769 A1 | 1/2008 | Sacha et al. |
| 2008/0158432 A1 | 7/2008 | Hwang et al. |
| 2008/0159548 A1 | 7/2008 | Solum |
| 2008/0205664 A1 | 8/2008 | Kim et al. |
| 2008/0232623 A1 | 9/2008 | Solum et al. |
| 2008/0238807 A1* | 10/2008 | Ibrahim et al. ............ 343/876 |
| 2008/0240453 A1 | 10/2008 | Westergaard |
| 2008/0260180 A1 | 10/2008 | Goldstien et al. |
| 2008/0273727 A1 | 11/2008 | Hagen et al. |
| 2008/0306745 A1 | 12/2008 | Roy et al. |
| 2009/0316922 A1 | 12/2009 | Merks et al. |
| 2010/0054512 A1 | 3/2010 | Solum |
| 2010/0148931 A1 | 6/2010 | Pappu et al. |
| 2010/0161208 A1 | 6/2010 | Akita et al. |
| 2010/0246865 A1 | 9/2010 | Suurballe |
| 2010/0321269 A1 | 12/2010 | Ishibana et al. |
| 2011/0009060 A1* | 1/2011 | Hsu et al. ............ 455/41.2 |
| 2011/0019830 A1 | 1/2011 | Leibman et al. |
| 2011/0067082 A1 | 3/2011 | Walker |
| 2011/0085687 A1 | 4/2011 | Edgar |
| 2011/0090837 A1 | 4/2011 | Duchscher et al. |
| 2011/0150251 A1 | 6/2011 | Solum et al. |
| 2011/0150252 A1 | 6/2011 | Solum et al. |
| 2011/0150254 A1 | 6/2011 | Solum et al. |
| 2011/0158442 A1 | 6/2011 | Woods |
| 2011/0249836 A1 | 10/2011 | Solum et al. |
| 2011/0249842 A1* | 10/2011 | Solum et al. ............ 381/315 |
| 2012/0093324 A1 | 4/2012 | Sinasi |
| 2012/0121094 A1 | 5/2012 | Solum |
| 2012/0177235 A1 | 7/2012 | Solum |
| 2012/0275629 A1 | 11/2012 | Meskens et al. |
| 2012/0308019 A1 | 12/2012 | Edwards |
| 2013/0004002 A1 | 1/2013 | Duchscher et al. |
| 2013/0017786 A1 | 1/2013 | Kvist et al. |
| 2013/0251180 A1 | 9/2013 | Solum |
| 2013/0308805 A1 | 11/2013 | Ozden |
| 2014/0023216 A1 | 1/2014 | Solum et al. |
| 2014/0059397 A1* | 2/2014 | Barker et al. ............ 714/712 |
| 2014/0087668 A1* | 3/2014 | Mow et al. ............ 455/67.14 |
| 2014/0177885 A1 | 6/2014 | Solum |
| 2014/0256373 A1* | 9/2014 | Hernandez et al. ............ 455/509 |
| 2014/0270213 A1 | 9/2014 | Greenbush |
| 2014/0270288 A1 | 9/2014 | Kryzer |
| 2014/0348359 A1 | 11/2014 | Woods |
| 2014/0355457 A1* | 12/2014 | Huang et al. ............ 370/252 |
| 2015/0003404 A1* | 1/2015 | Gokturk et al. ............ 370/330 |
| 2015/0023513 A1 | 1/2015 | Solum |

(56) References Cited

U.S. PATENT DOCUMENTS

| | | |
|---|---|---|
| 2015/0036855 A1 | 2/2015 | Solum et al. |
| 2015/0071469 A1 | 3/2015 | Solum et al. |

FOREIGN PATENT DOCUMENTS

| | | | |
|---|---|---|---|
| CN | 1191060 A | 8/1998 | |
| CN | 101233786 B | 5/2013 | |
| DE | 2510731 A1 | 9/1976 | |
| DE | 3036417 A1 | 5/1982 | |
| DE | 3443907 A1 | 6/1985 | |
| DE | 10146886 A1 | 4/2003 | |
| EP | 0789474 A2 | 8/1997 | |
| EP | 0941014 A2 | 9/1999 | |
| EP | 0989775 A1 | 3/2000 | |
| EP | 1185138 A2 | 3/2002 | |
| EP | 1196008 A2 | 4/2002 | |
| EP | 1365628 A2 | 11/2003 | |
| EP | 1398995 A2 | 3/2004 | |
| EP | 1174003 B1 | 7/2004 | |
| EP | 1445982 A1 | 8/2004 | |
| EP | 1484942 A2 | 12/2004 | |
| EP | 1519625 A2 | 3/2005 | |
| EP | 1531650 A2 | 5/2005 | |
| EP | 1670283 A1 | 6/2006 | |
| EP | 1715718 A2 | 10/2006 | |
| EP | 1950586 A2 * | 7/2008 | ........... G01V 11/002 |
| EP | 1950586 A2 | 7/2008 | |
| EP | 1953934 A1 | 8/2008 | |
| EP | 1980132 B1 | 10/2008 | |
| EP | 2012557 A2 | 1/2009 | |
| EP | 2019493 A2 | 1/2009 | |
| EP | 2052758 A1 | 4/2009 | |
| EP | 2328370 A1 | 6/2011 | |
| EP | 1365628 B1 | 12/2011 | |
| EP | 2403273 A1 | 1/2012 | |
| EP | 1879426 B1 | 8/2013 | |
| EP | 2765650 A1 | 8/2014 | |
| EP | 2779698 A2 | 9/2014 | |
| EP | 2779699 A2 | 9/2014 | |
| FR | 2714561 A1 | 6/1995 | |
| JP | 918998 A | 1/1997 | |
| JP | 10084209 | 3/1998 | |
| JP | 201490467 A | 5/2014 | |
| KR | 101253799 B1 | 4/2013 | |
| WO | WO-9641498 A1 | 12/1996 | |
| WO | WO-1996041498 A1 | 12/1996 | |
| WO | WO-0021332 A2 | 4/2000 | |
| WO | WO-0022874 A2 | 4/2000 | |
| WO | WO-0077755 A1 | 12/2000 | |
| WO | WO-0158064 A1 | 8/2001 | |
| WO | WO-0167433 A1 | 9/2001 | |
| WO | WO-0203750 A2 | 1/2002 | |
| WO | WO-0209363 A2 | 1/2002 | |
| WO | WO-2002009363 A2 | 1/2002 | |
| WO | WO-0223950 A2 | 3/2002 | |
| WO | WO-02061957 A2 | 8/2002 | |
| WO | WO-03008013 A2 | 1/2003 | |
| WO | WO-04034738 A1 | 4/2004 | |
| WO | WO-2004100607 A1 | 11/2004 | |
| WO | WO-2004110099 A2 | 12/2004 | |
| WO | WO-2005009072 A2 | 1/2005 | |
| WO | WO-2005061048 A1 | 7/2005 | |
| WO | WO-2005101731 A2 | 10/2005 | |
| WO | WO-2006023857 A1 | 3/2006 | |
| WO | WO-2006023920 A1 | 3/2006 | |
| WO | WO-2006074655 A1 | 7/2006 | |
| WO | WO-2006078586 A2 | 7/2006 | |
| WO | WO-2006133158 A1 | 12/2006 | |
| WO | WO-2007068243 A1 | 6/2007 | |
| WO | WO-2009063097 A2 | 5/2009 | |
| WO | WO-2009076949 A1 | 6/2009 | |
| WO | WO-2010033731 A1 | 3/2010 | |
| WO | WO-2012092973 A1 | 7/2012 | |

OTHER PUBLICATIONS

"European Application Serial No. 15166541.1, Extended European Search Report dated Sep. 23, 2015", 7 pgs.

"European Application Serial No. 15166541.1, Communication Pursuant to Article 94(3) EPC dated Mar. 28, 2018", 6 pgs.

* cited by examiner

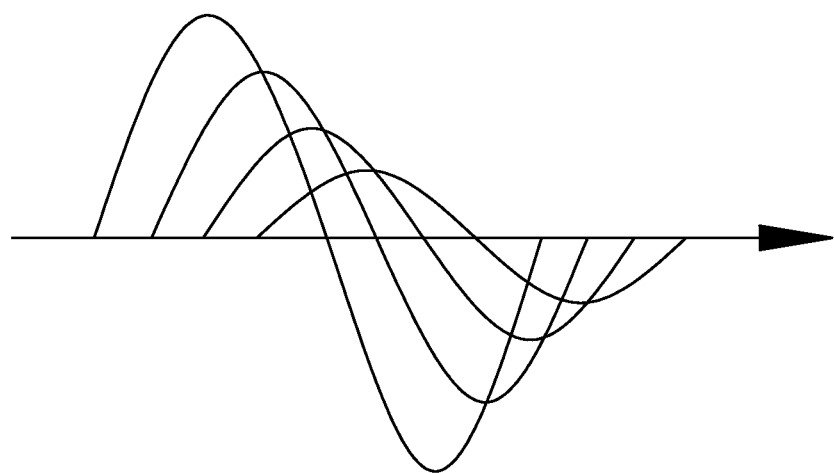
*Fig. 3*
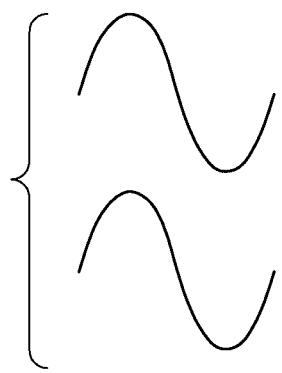 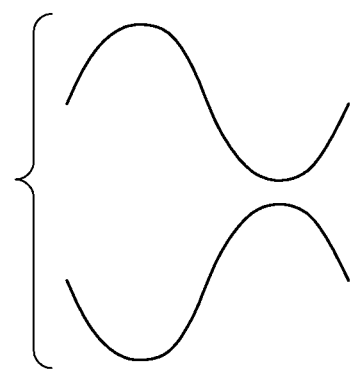
CONSTRUCTIVE
OR SYMPATHETIC
DESTRUCTIVE
*Fig. 4A*    *Fig. 4B*

|  | CHANNEL 1 | CHANNEL 2 | CHANNEL 3 | CHANNEL 4 | CHANNEL 5 | CHANNEL 6 | CHANNEL 7 | CHANNEL 8 | CHANNEL 9 | CHANNEL 10 |
|---|---|---|---|---|---|---|---|---|---|---|
| 100% | -96 | -54 | -53 | -61 | -77 | -86 | -75 | -85 | -77 | -76 |
| 80% | -98 | -77 | -75 | -88 | -91 | -98 | -97 | -95 | -87 | -85 |
| 60% | -98 | -88 | -84 | -91 | -98 | -98 | -98 | -97 | -94 | -90 |
| 40% | -99 | -92 | -90 | -93 | -98 | -99 | -98 | -98 | -97 | -93 |
| 20% | -99 | -95 | -95 | -96 | -99 | -99 | -99 | -98 | -98 | -94 |
| 0% | -100 | -99 | -100 | -99 | -100 | -100 | -100 | -100 | -99 | -99 |

Fig. 16

WIRELESS COMMUNICATION WITH PROBING BANDWIDTH

TECHNICAL FIELD

This document relates generally to wireless communication systems and more particularly to methods and apparatus for identifying desirable channels for wireless communication.

BACKGROUND

Radio waves are electromagnetic waves that can be used in wireless communication. The frequencies of these waves serve as physical communication channels. The radio frequency (RF) spectrum has a finite range of frequencies, and thus a limited number of channels. In the United States, for example, the Federal Communications Commission (FCC) decides how the spectrum is allocated and what bands are used for what purpose. Communication signals on the same channel interfere, assuming the strengths of the signals are non-negligible due to transmission power and distance. Also, communication signals on adjacent channels may interfere with communications on the desired channel because of inadequate filtering, tuning or frequency control. Adjacent channel interference can increase with an increase in signal power in adjacent channels.

Most countries of the world have allocated certain frequency spectrums for commercial use as "unlicensed" wireless bands. For example, the FCC has designated license-free bandwidth segments for industrial, scientific and medical (ISM) uses. Various commercial applications use this unlicensed bandwidth for short range wireless communication. Channels are not allocated within the license-free band. Commercial devices designed to operate in the license-free band are constrained to transmit using a relatively low power, which allows more commercial devices to use the unlicensed frequency bands by increasing the reuse of a frequency.

Furthermore, not only may a number of commercial devices be operating within a communication band, but also more than one wireless technology may co-exist within the communication band. For example, the 2.4 GHz band includes wireless LAN, Bluetooth and IEEE 802.15.4 technologies. Wireless LAN has three non-overlapping channels with a bandwidth of 22 MHz. Bluetooth technology has 79 channels each with a bandwidth of 1 MHz, Bluetooth low energy technology has 40 channels each with a bandwidth of 2 MHz, and IEEE 802.15.4 has 11 channels with a bandwidth of 5 MHz. Wireless communication devices attempt to select adequate channels through which to communicate within this environment. For example, adaptive frequency selection may be used to select adequate channels based on both RSSI (Received Signal Strength Indication) noise measurements and based on retransmission attempts. Bluetooth has used adaptive frequency hopping (AFH) techniques to use only channels that do not have interference by measuring RSSI of unused channels and by keeping track of retransmissions on active channels. For example, PER (Packet Error Rate) may be used to assess the link quality of a communication channel. However, with AFH, a degraded signal is received before the channel is determined bad and removed from the channel map.

One challenge with RF communication is multipath propagation of signals in which radio signals reach the receiving antenna by two or more paths. The overall signal at the radio receiver is the sum of the signals being received. As multipath signals have different path lengths, the signals will add and subtract from the total dependent upon their relative phases. The effects of multipath include constructive and destructive interference and phase shifting of the signal, which may be perceived as multipath fading of RF signals. A mobile wireless device, particularly within a building, may encounter a dynamically-changing environment of multipath propagation as the device changes locations and orientations, and as objects and people also move within this environment. For example, an RF communication device typically worn by a human experiences dynamic multipath fading that is dynamic relative to the movements of a human being. These movements are far too fast for current adaptive frequency hopping techniques.

Accordingly, there is a need in the art for improving wireless communication with multipath propagation.

SUMMARY

Disclosed herein, among other things, are wireless communication systems and methods. By way of example, an embodiment of a system includes a first device and a second device configured to communicate over a selected wireless communication channel selected from a band of channels or over a selected set of channels used in an adaptive frequency hopping scheme. In the example, the first device is configured to transmit a probe signal that has a plurality of frequencies contained within the band of channels, and the second device is configured to determine a signal strength of the probe signal for each of a plurality of potential communication channels within the band of channels. The first and second devices configured to switch to another wireless communication channel based at least in part on the signal strength of the probe signal for each of a plurality of potential wireless communication channels.

An example of a method includes communicating over a selected wireless communication channel selected from a band of channels, transmitting a probe signal that has a plurality of frequencies contained within the band of channels, determining a signal strength for each of a plurality of potential wireless communication channels within the band of channels, and switching to another wireless communication channel based at least in part on at least one of: a carrier signal (C) strength for the probe signal for each of a plurality of potential wireless communication channels; or the carrier signal (C)-to-noise (N)-and-interference (I) ratio (C/(N+I)) for each of a plurality of potential wireless communication channels.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 3 is a simple illustration, provided by way of example and not limitation, of the multipath waveforms in the time domain that may be received at a wireless receiver FIGS. 4A and 4B illustrate constructive wave interference and destructive wave interference.

FIG. 16 illustrates an example of a table populated with statistical information for the sampled N+I strengths.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates to wireless communication, which may include standard or nonstandard communications. Some examples of standard wireless communications include, but are not limited to, Bluetooth, IEEE 802.11 (wireless LANs), 802.15 (WPANs), 802.16 (WiMAX), cellular protocols (e.g. CDMA and GSM), ZigBee, and ultra-wideband (UWB) technologies. It is understood that the standards which can be used include past and present standards. It is also contemplated that future versions of these standards and new future standards may be employed without departing from the scope of the present subject matter.

The present subject matter allows for fast analysis of the bandwidth, such as may be beneficial when analyzing multipath propagation. This fast analysis may be particularly beneficial to analyze multipath propagation when an RF communication device is worn indoors by a human. Dynamic multipath fading, that is dynamic relative to the movements of a human, is far too fast for current adaptive frequency hopping techniques to take advantage of sympathetic multipath. However, various embodiments of the present subject matter rapidly update channel information to take advantage of sympathetic multipath propagation by using only those frequencies that have sympathetic responses to multipath signals. The sympathetic multipath propagation enhances the strength of the received signal. With the enhanced signal strength, the communication may be modified to take advantage of the enhanced signal strength using, for example, lower power and smaller antennas.

Figure 1:
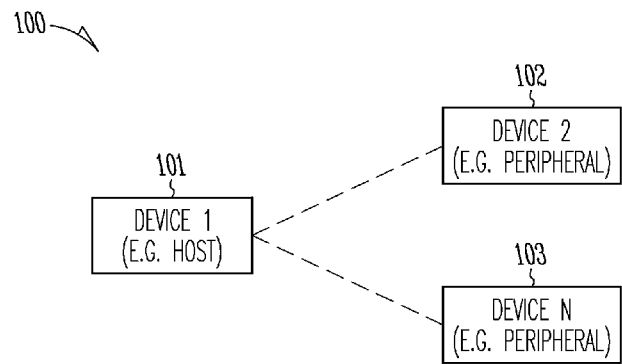
FIG. 1 illustrates, by way of example and not limitation, some devices within a wireless communication network.

FIG. 1 illustrates, by way of example and not limitation, some devices within a wireless communication network. The devices may be configured to communicate within a wireless network. The network may be configured such that any device in the wireless network may communicate with any one or more of the devices on the network. In some embodiments, the devices may be configured to function as host(s) and to function as peripheral(s). For example, the system 100 illustrated in FIG. 1 includes a device 101 that functions as the host, and may also include one or more other devices 102, 103 that function as peripheral devices. A host may be a device that sends and receives information on a network, and a peripheral may be wirelessly connected to the host. By way of example and not limitation, a host may be connected to a wireless network, and may be connected to a peripheral using Bluetooth technology.

The wireless communication between two wireless devices may be referred to as a wireless communication link. The communication link is used to communicate information. Examples of information include, but are not limited to, audio data or other data, commands, and programming instructions. In RF communication, the communication link uses a transmission frequency to establish the link in a communication channel.

Figure 2:
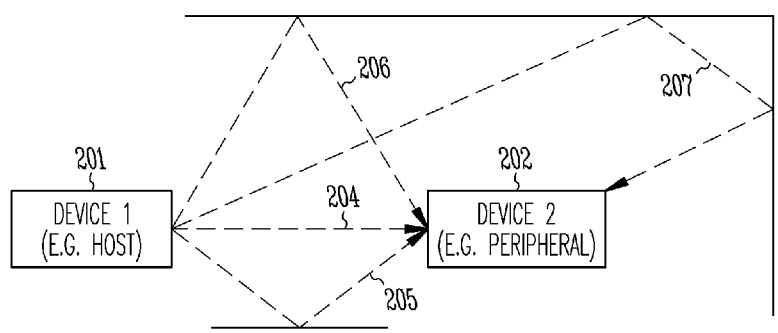
FIG. 2 is a simple illustration of multipath propagation that may exist during wireless communication.

FIG. 2 is a simple illustration of multipath propagation that may exist during wireless communication. Multipath propagation indicates that radio signals are reaching the receiving antenna by two or more paths. The RF signals may be directly communicated between devices, but also may reflect off of surfaces such as walls, ceilings, floors, furniture, etc. For example, the simple illustration of FIG. 2 shows a first device 201 and a second device 202, and further shows four wireless communication paths. A first path 204 may be a direct, straight-line path between the devices, a second path 205 may be reflected off of a floor, a third path 206 may be reflected off of a ceiling, and a fourth path 207 may be reflected off of a ceiling and a wall.

FIG. 3 is a simple illustration, provided by way of example and not limitation, of the multipath waveforms in the time domain that may be received at a wireless receiver. The overall signal at the radio receiver is the sum of the signals being received. As multipath signals have different path lengths, the signals will add and subtract from the total dependent upon their relative phases. In FIG. 3, four signals are received. These signals may have traveled the paths illustrated in FIG. 2. Although the signals have the same frequency, they have different phases introduced by the different lengths of the different paths, causing the signals to be received at different times. Further, the strength of the signals (e.g. amplitude) from each of these paths may also be different. Frequency is inversely related to wavelength. Thus, a change in frequency (e.g. channel change) changes the wavelength. The different wavelengths will change how the phases of the multipath signals align at the receiver.

Figure 6:
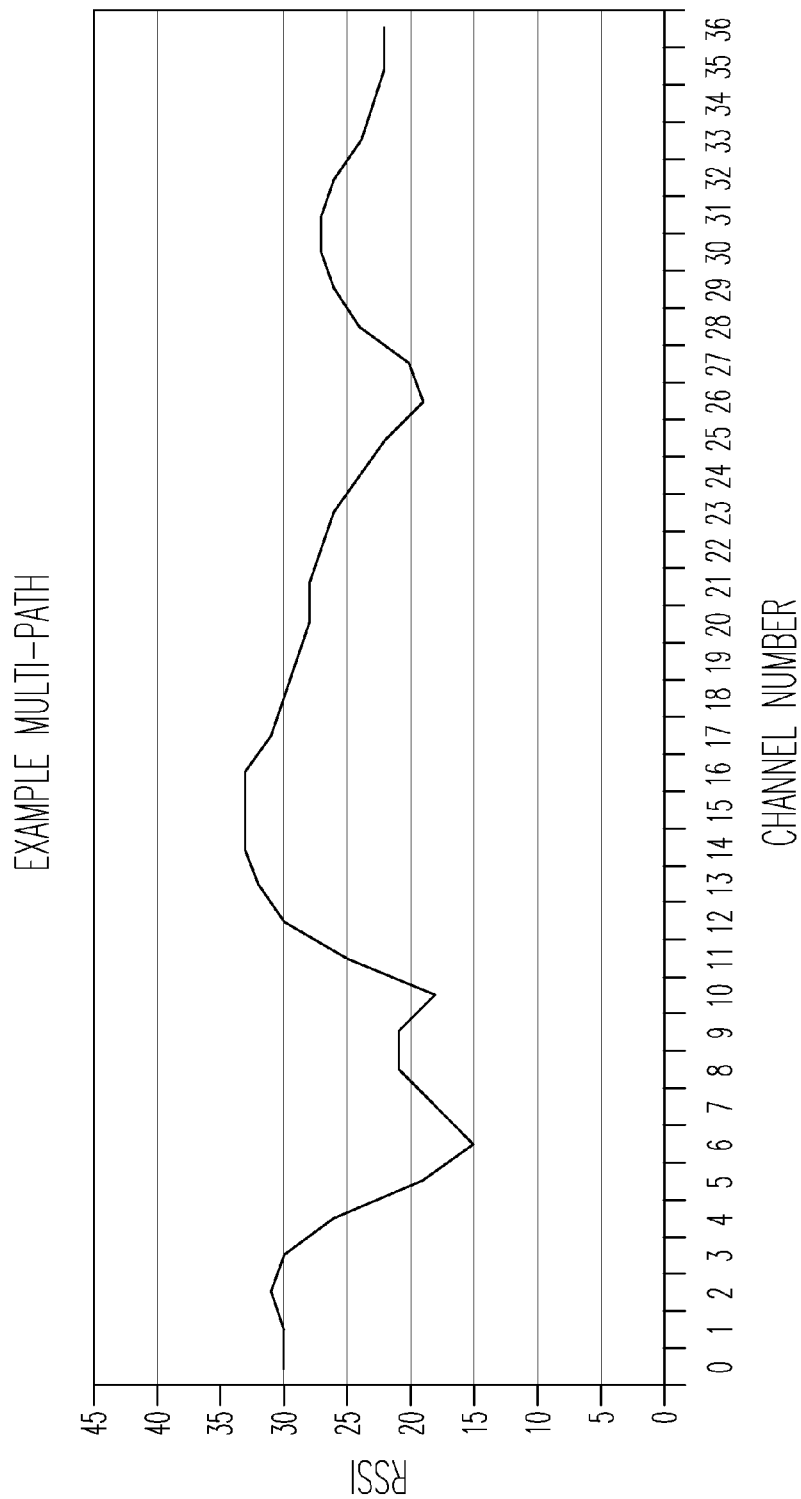
FIG. 6 illustrates an example of multipath propagation at 2.4 GHz.

The effects of multipath include constructive and destructive interference and phase shifting of the signal, which may be perceived as multipath fading of RF signals. FIGS. 4A and 4B illustrate constructive wave interference and destructive wave interference for two waves. When two waves constructively interfere as illustrated in FIG. 4A, they arrive generally in phase with each other so that sum of the amplitudes of each signal is greater than the amplitude of one of the signals. When two waves destructively interfere as illustrated in FIG. 4B, they arrive generally out of phase with each other so that the amplitudes of the signals at least partially cancel each other. These figures are simple illustrations indicating a phase difference of about 0 degrees in FIG. 4A and a phase difference of about 180 degrees in FIG. 4B. Multipath propagation is more complex such as is generally shown in the multipath example of FIG. 6, as it involves multiple signal paths that have multiple phase differences. However, in comparison to signal strength in the straight-line path, the multipath signals sum together in a manner that still may generally enhance the strength of the received signal or may generally reduce the strength of the received signal. Mobile wireless devices, particularly within a building, may encounter a dynamically-changing environment of multipath propagation as it changes locations and orientations, and as objects and people also move within this environment. For example, an RF communication device typically worn by a human experiences dynamic multipath fading that is dynamic relative to the movements of a human being.

Figure 5:
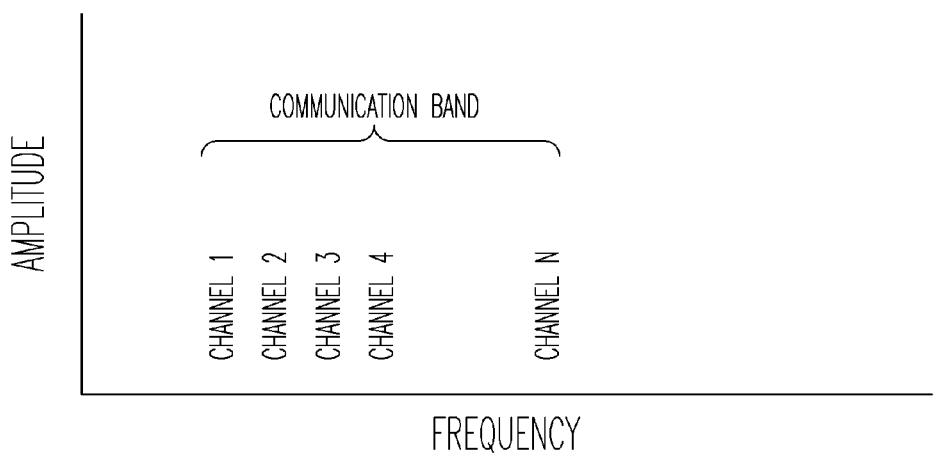
FIG. 5, by way of example and not limitation, provides a general illustration of a communication band of channels.

FIG. 5, by way of example and not limitation, provides a general illustration of a communication band of channels. The bandwidth of the channels depends on the technology used. Further, channels may also have some significant overlap for certain technologies. The channels correspond to specific communication frequencies, each of these communication frequencies have a characteristic wavelength. Thus, given a certain set of communication paths in a multipath environment, some channels will reduce the signal strength more than other channels. Further, some channels may enhance the strength of the received signal, whereas other channels will reduce the strength of the received signal. The present subject matter is capable of rapidly updating channel information so that appropriate channels can be selected in a rapidly changing multipath environment. For example, some embodiments may update channel information multiple times a second.

By way of example, a system may have a first device and a second device configured to communicate over a selected wireless communication channel selected from a band of channels. The first device may be configured to transmit a probe signal that has a plurality of frequencies contained within the band of channels, and the second device may be configured to determine a signal strength of the probe signal for each of a plurality of potential communication channels within the band of channels. The probe signal may be a pulse that has a plurality of frequencies that correspond to the channels in the communication band (e.g. channels 0-36 in the communication band illustrated in FIG. 6). The strength of the received signal (e.g. RSSI) may be analyzed for the channels of interest. An example of multipath propagation at 2.4 GHz is provided in FIG. 6. The channel with the highest strength, or at least one of the highest strengths, may be selected for the communication. For example, with reference to FIG. 6, only those channels with an RSSI over 25 or only those channels with an RSSI over 30 may be available to be chosen for the communication channel. Some embodiments may make only the highest percentage (e.g. highest 10% or another percentage) available to be chosen for the communication channel. In some embodiments, the higher-strength channels such as those with a sympathetic multipath propagation may be selected for further link quality analysis, and the channel may be selected based on a combination of the strength of the received probe signal and the link quality.

Figure 7A:
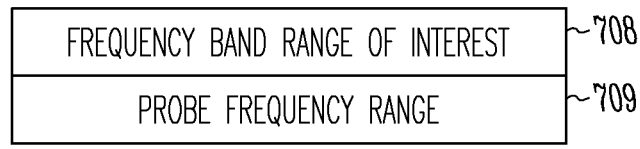
FIGS. 7A-7C illustrates some examples in which a frequency band may be probed to find a desirable channel.
Figure 7B:
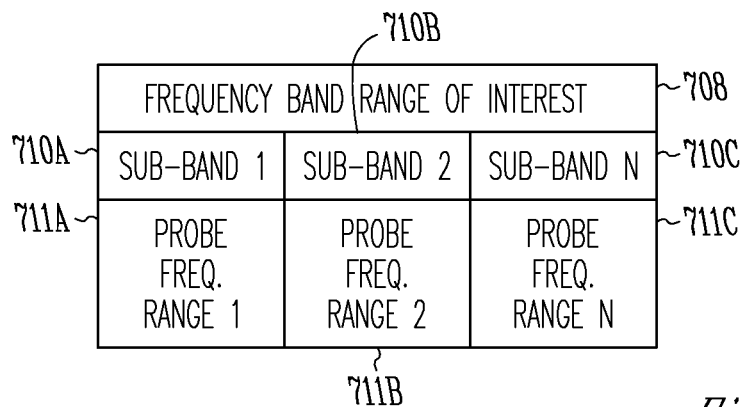
Figure 7C:
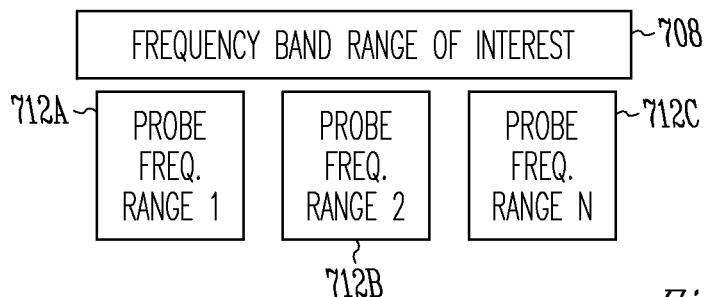

FIGS. 7A-7C illustrates some examples in which a frequency band may be probed to find a desirable channel. Each of FIGS. 7A-7C illustrate a frequency band of interest 708, which may represent channels that may be selected for use as the communication channel. The probe signal may include frequencies within a frequency range across the frequency band of interest, as illustrated at 709 in FIG. 7A. The communication band may be processed using several sub-bands. Probe signal pulses could then transmit at frequencies across the sub-band, reducing interference to other users of the band. The sub-band approach could reduce the complexity of the receiver signal processing in the hearing aid. For example, FIG. 7B illustrates the frequency band of interest has N sub-bands 710A, 710B, 710C. N different probe signals 711A, 711B, 711C may be transmitted, where each of the N probe signals has frequencies that extend across a respective one of the N sub-bands. Some embodiments, such is generally illustrated in FIG. 7C, may probe a sampling of the frequencies 712A, 712B, 712C contained within the sub-band of interest. The probe may be transmitted on narrow band carriers, similar to a single channel of operation. The transmitter and receiver could tune to every $n^{th}$ channel, providing an RSSI estimate for a set of channels across the band. The measured channels could then be interpolated to provide an estimated RSSI on all channels.

Thus, the probe signal probes the RF spectrum by sweeping across a plurality of frequencies, to find a satisfactory or best channel for communication. This sweep across a plurality of channels may be referred to as wideband characterization of the RF environment. This provides a faster and better optimized AFH system. Further, this is fast enough to identify the channels that use multipath propagation to enhance the transmitted signal. Conventional AFH mitigates interference, but does not address quickly varying multipath propagation.

This wideband characterization may be accomplished with any known unmodulated (CW) or modulated narrowband signal sweep or wider band modulated signal (with narrow Rx) as well. For example, the probe signal may be a "chirp signal" or a wideband RF signal.

A chirp pulse is a frequency modulated pulse. An up-chirp pulse may monotonically change the frequency from a lower value at the beginning of the pulse to a higher value at the end of the pulse; whereas a down-chirp pulse may monotonically change the frequency from a higher value at the beginning of the pulse to a lower value at the end of the pulse. The change in frequency may follow a linear function or an exponential function across the pulse. Creating the chirp signal pulse could be as simple as using a digital to analog controller (DAC) to ramp (e.g. ramp according to a linear function or according to an exponential function) a voltage up or down to control a voltage controlled oscillator (VCO).

Figure 8A:
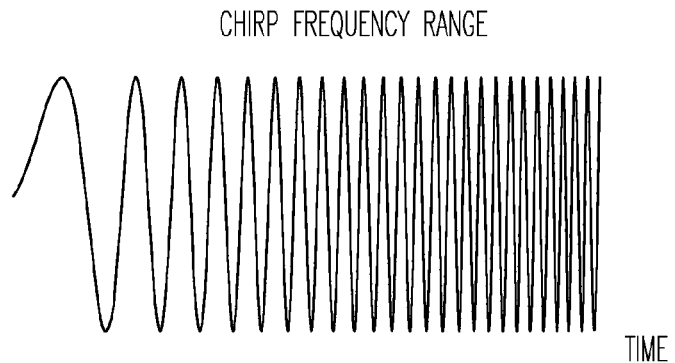
FIGS. 8A-8B illustrate, by way of example, a time domain and a frequency domain illustration, respectively, of an up-chirp pulse.
Figure 8B:
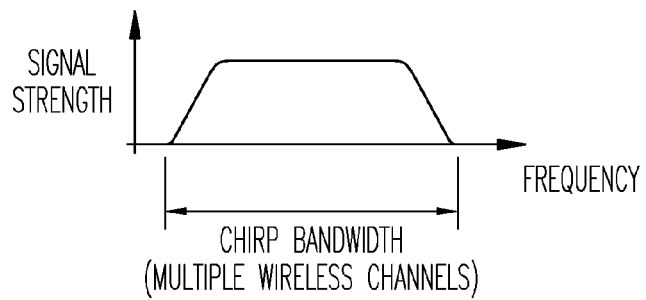

FIGS. 8A-8B illustrate, by way of example, a time domain and a frequency domain illustration, respectively, of an up-chirp pulse. The frequency of the chirp pulse increases during the duration of the pulse. The chirp includes a plurality of frequencies spanning across a plurality of channels. Furthermore, the power of the chirp pulse may be substantially equal across the chirp bandwidth. It is generally desirable to have a consistent power spectrum across the bandwidth of the probe, and it is also generally desirable for the consistent power spectrum to be uniform. However, consistent variations in the power spectrum (e.g. lower power at higher frequencies) may be compensated during the processing of the received probe signal. The uniformity and conformity of the power spectrum should be sufficient to provide a useful comparison of received signal strength for the different channels.

In some embodiments, a peripheral device may send a chirp signal, which may sweep the RF band with a continuous wave signal from one end of the band to the other. The host device can implement a multi-channel receiver, a wideband receiver, or a fast-scanning receiver to map the signal strength of the chirp signal from the peripheral device. This channel map will determine the receive signal strength on each potential channel used for communication. Once the map is updated the host device can use the channels receiving the highest intensity from the peripheral device during the chirp for subsequent use in the communications channel map for either adaptive frequency selection in which case it uses the "best channel(s)" (highest intensity) or in adaptive frequency hopping in which it uses the "best set of channels" for communication with the peripheral device.

Figure 9:
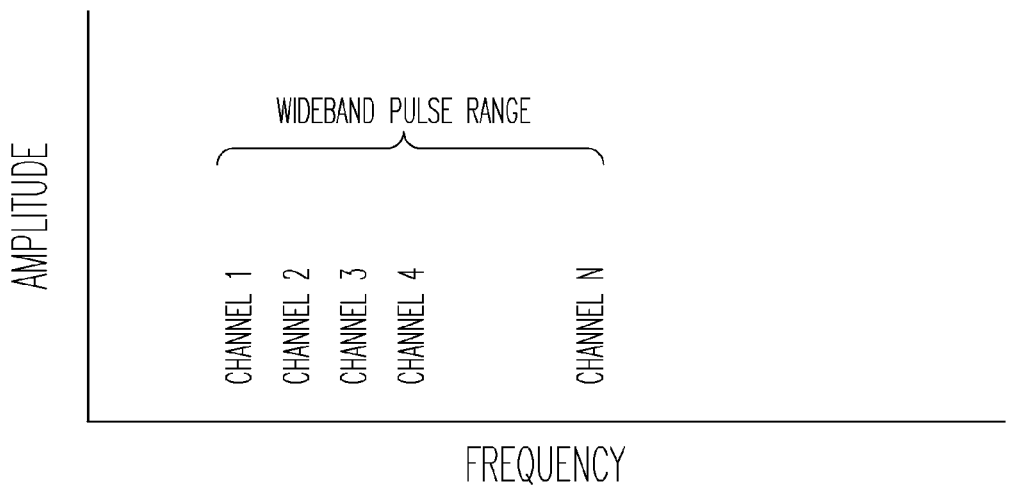
FIG. 9 illustrates an example of a wideband pulse in a frequency domain.

FIG. 9 illustrates an example of a wideband pulse in a frequency domain. Such a wideband pulse may be used as the probe signal. The signal pulse need not monotonically increase or decrease in frequency. However, the wideband pulse does have frequency components that extend across the frequencies for a number of channels. In some embodiments, the peripheral device may send a pulse "wideband" RF signal to the host device. The host device using a wideband receiver can map the best channels for use with the peripheral device.

Various embodiments coordinate devices to know when one device is to send the probe signal and when the other device is to receive and analyze the probe signal. For example, the device that transmits the probe signal may communicate or otherwise signal probe signal timing to the other device. According to some embodiments, a peripheral device may send a "chirp start" packet on the narrow band RF channel being used for the communication before sending the chirp. Upon reception of the "chirp start" packet, a receiver that would sweep the band may be initialized, and then the chirp transmission may be sent. The chirp receiver could be a relatively simple narrow band receiver, with a swept oscillator, similar to the chirp transmitter in the peripheral device. In an example, the device that receives and analyzes the probe signal may communicate or otherwise signal the timing to the device that transmits the probe signal. In some embodiments, each of the devices is programmed with a protocol that defines when the probe signal will be delivered. For example, the protocol may use programmed start times to control the timing of the transmission and reception of the probe signal, and/or may use specific conditions of the communication channels to control the timing.

The wideband probe signal is different from the wireless communication. The wireless communication link is not used for estimating channel quality. The channel scanning approach, while using the communication link, can run the tests in the background and not have it be part of the active wireless link. In another embodiment, the probe signal may be similar to the signal used in the wireless link.

Figure 10:
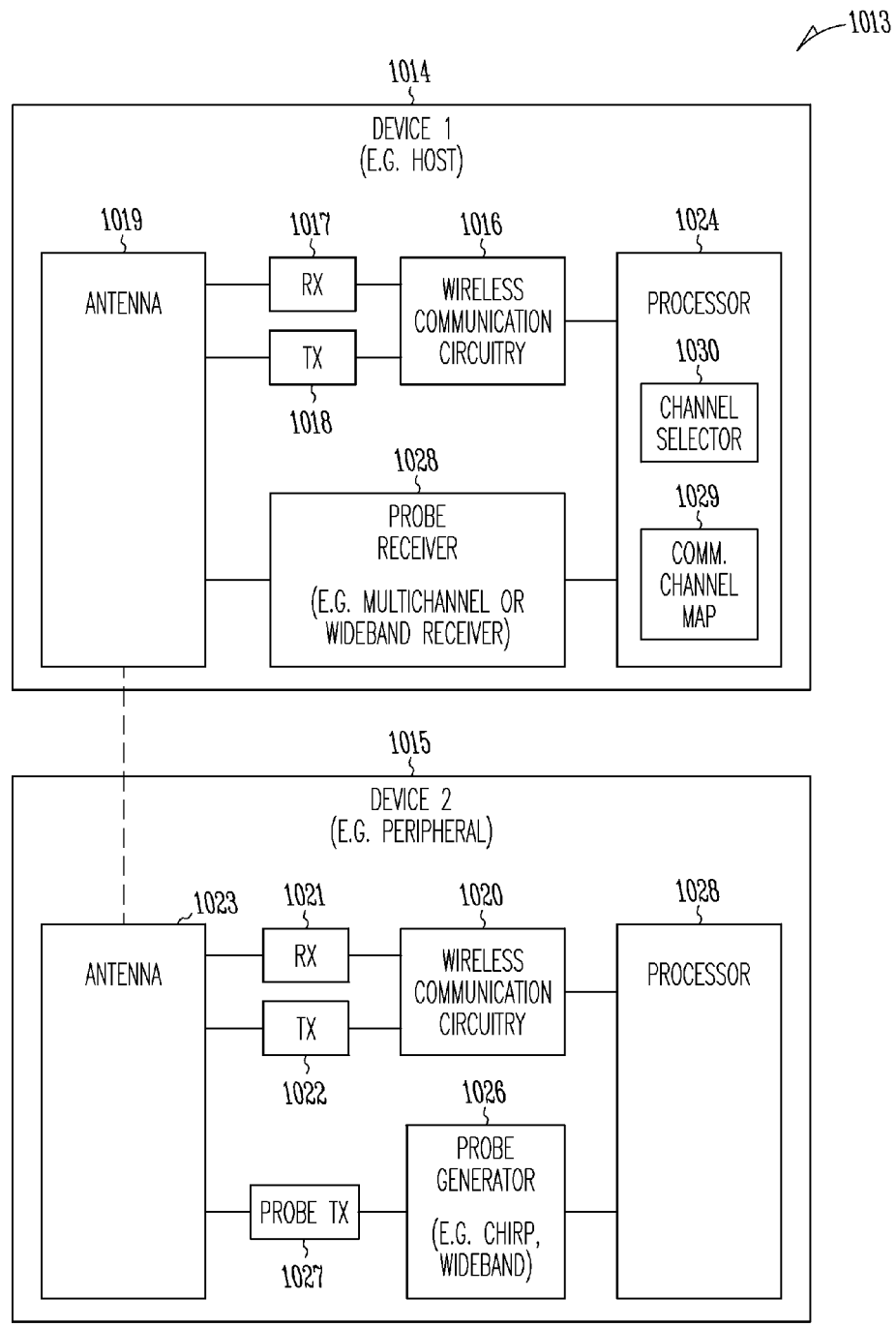
FIG. 10 illustrates an example of a system capable of wirelessly-communicating and probing bandwidth.

FIG. 10 illustrates an example of a system capable of wirelessly-communicating and probing bandwidth. The illustrated system 1013 includes a first device 1014 and a second device 1015 configured to communicate over a wireless communication link. The first device 1014 may be configured to function as a host and the second device 1015 may be configured to function as a peripheral. The first device 1014 includes wireless communication circuitry 1016, a receiver 1017, a transmitter 1018, and an antenna 1019. The second device 1015 also includes wireless communication circuitry 1020, a receiver 1021, a transmitter 1022, and an antenna 1023. The wireless communication circuitry may control the wireless communication according to a protocol for the particular wireless technology. Each of the illustrated devices also includes a processor 1024, 1028 that may control at least some of the processes performed by the device, and some of these processes may require information to be wirelessly communicated over a wireless communication link. For example, some system embodiments may transmit audio data across the communication link. The second device 1015 also includes a probe generator 1026 configured to provide a probe signal pulse (e.g. chirp signal pulse or wideband signal pulse) connected to a probe transmitter 1027, which is connected to the antenna 1023. The probe generator 1026 can generate the probe signal pulse, and this probe signal pulse may be transmitted as the wireless communication circuitry 1020 continues to communicate over the wireless communication channel. The first device 1014 may include a probe receiver 1028 configured for use in receiving a wideband probe signal pulse and analyzing the strength of the received probe signal pulse (e.g. RSSI of the probe signal pulse). The processor 1024 of the first device 1014 may use the RSSI of the probe signal pulse to update a communication channel map 1029, and use the updated channel map to select a desired channel 1030 for communication. For example, the desired channel(s) may be the channel(s) with the largest, or one of the largest, RSSI values such as may be attributable to sympathetic multipath propagation. The first device may send the channel change information to the second device over the communication channel before switching communication channels to the new channel. The updating of the channel map information may occur multiple times per second, and thus is quick enough to accommodate the changes in a multipath environment for wearable devices such as, but not limited to, hearing aids.

Systems may be designed with bidirection probing capability. In the system illustrated in FIG. 10 for example, both the first device 1014 and the second device 1015 may each include a probe receiver similar to probe receiver 1028, a probe generator similar to probe generator 1026 and a probe transmitter similar to probe transmitter 1027. Similarly, the processor 1028 of the second device may also be configured to update a communication channel map and use the updated channel map to select a desired channel or set of channels for communication.

It is understood that the devices may be configured to perform specific functions, and that all of the components to perform those functions are not illustrated. For example, a hearing aid may include a microphone, amplifiers, signal processing, and a speaker (referred to as a receiver). Other mobile devices may include, by way of example and not limitation, components such as speakers, displays, input devices, camera lens, image processors, memory and the like.

Figure 11:
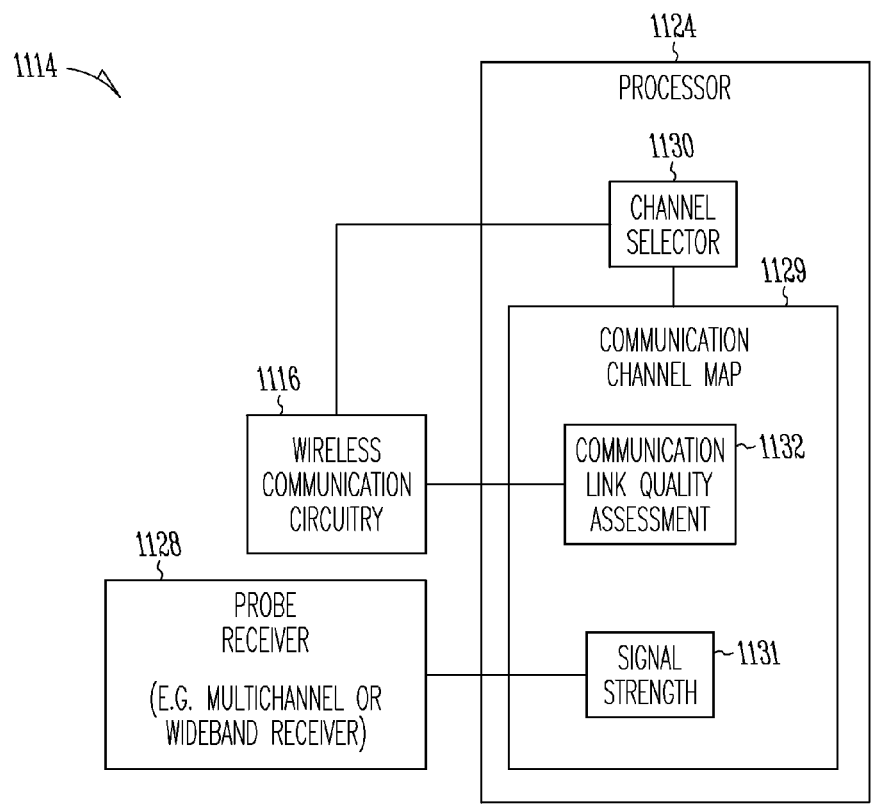
FIG. 11 illustrates an example of a device that analyzes probed channels and maintains a channel map, and that further selects a wireless communication channel.

FIG. 11 illustrates an example of a device that analyzes probed channels and maintains a channel map, and that further selects a wireless communication channel. For example, the illustrated device 1114 may be included in the first device 1014 illustrated in FIG. 10. The device illustrated in FIG. 11 includes a processor 1124, wireless communication circuitry 1116 and a probe receiver 1128 similar to as illustrated in the first device of FIG. 10. The processor may be configured with a communication channel map 1129 and configured to update the channel map, and may also be configured with a channel selector 1130. The channel map may be used to update channel information include signal strength information (e.g. RSSI) 1131 from the probe signal pulse as well as other information regarding an assessed communication link quality for different channel 1132. This information may be used to select a desirable communication channel to be used for the wireless communication link. For example, the RSSI of the probe signal may be used to limit the number of potential communication channels for further evaluation using the assessed link quality. By way of example and not limitation, Packet Error Rate or signal-to-(noise+interference) ratio could be measured to provide an additional measure of link quality.

Various embodiments may use link quality information, also referred to herein as channel metrics, for wireless communication channels to manage and make adjustments to the wireless communication. Battery-powered remote devices that function as hearing assistance devices (e.g. hearing aids) transmit with limited power, such that, as seen by the receiver of the transmission (e.g. communicator or other hearing aids), the transmission is near the noise floor of the occupied channel. In order to provide low power devices, the communication signal has little link margin. A high data throughput can be achieved using a low power RF link when the link is of good quality. However, multi-path fading, interference, body and head shadowing, and increased range potentially impair the link. An assessment of link quality for a wireless communication channel can be made by assessing noise in the channel, or signal strength in the channel, or a signal to noise ratio for the channel, or a bit error rate, or a packet error rate, or the number of retransmissions, or various combinations thereof. U.S. Pat. No. 8,442,248 entitled SYSTEMS AND METHODS FOR MANAGING WIRELESS COMMUNICATION LINKS FOR HEARING ASSISTANCE DEVICES discusses the assessment and use of link quality information, and is hereby incorporated by reference in its entirety.

Figure 15:
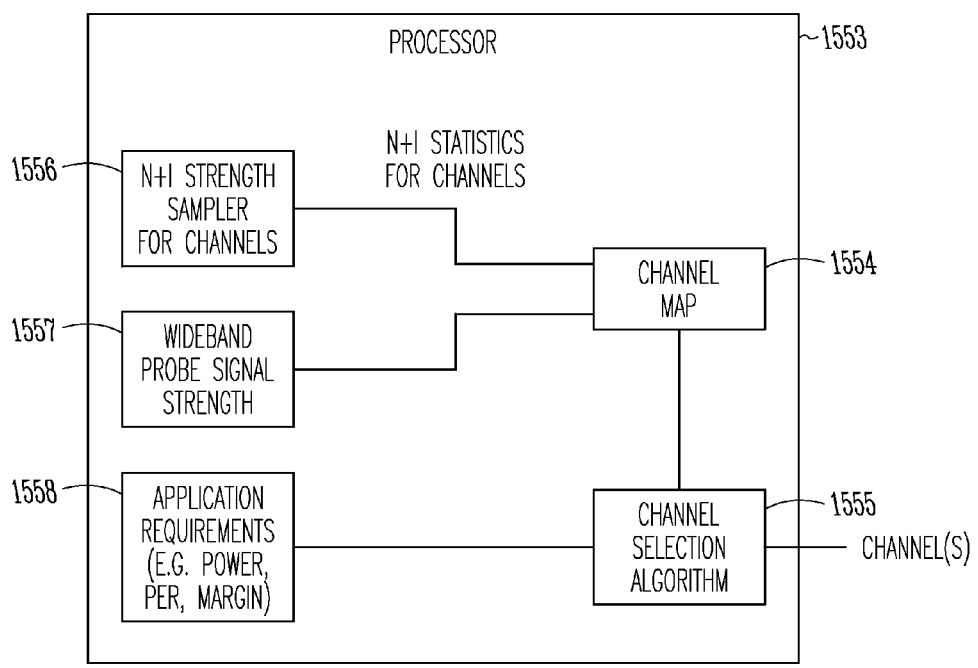
FIG. 15 illustrates an example of a system to select channel(s).
Figure 17:
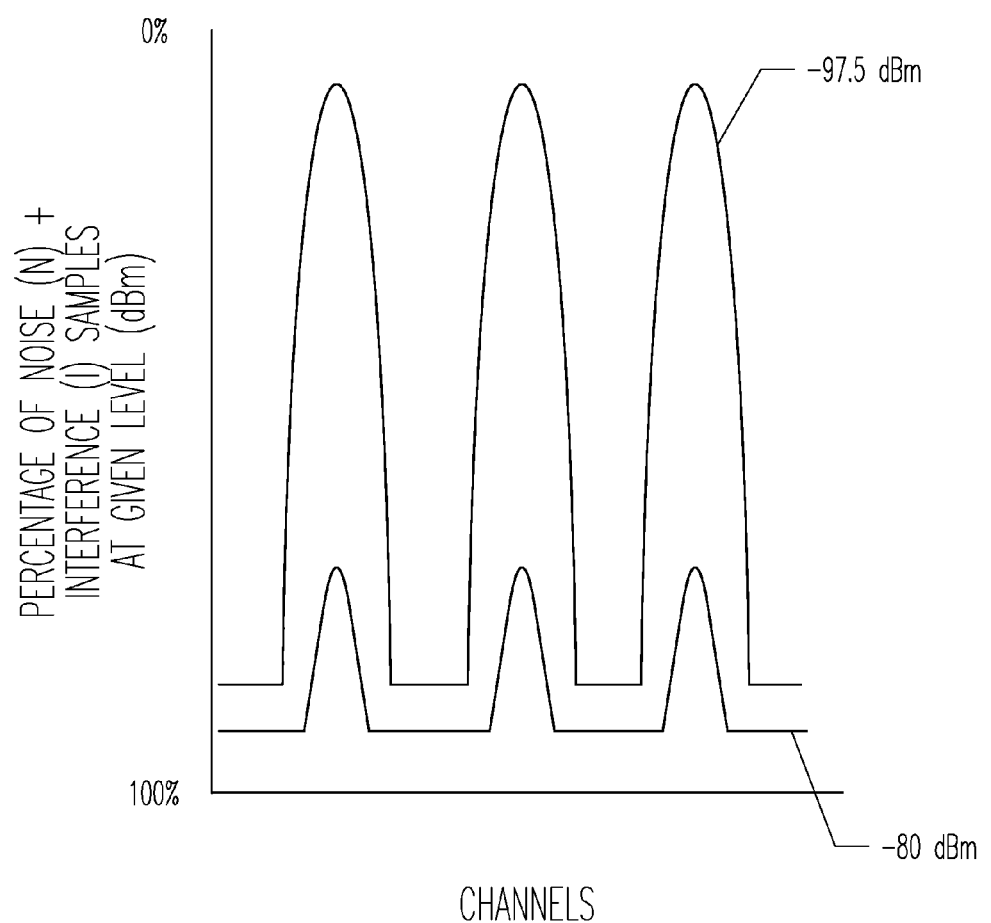
FIG. 17, for example, illustrates a pattern of sensed noise across many channels that may be identified by a table populated with statistical information for the sampled N+I strengths.

By way of example and not limitation, a band of channels may be evaluated by analyzing both the signal strength (RSSI) of the probe signal for channel as well as the carrier signal (C)-to-noise (N)-and-interference (I) ratio (C/(N+I)) for the carrier signal. The interference (I) may be from an interfering radio transmitter and the noise (N) may be from other sources. The channel may be analyzed during a time when the probe is transmitted to determine a strength (e.g. RSSI) of the carrier signal in the channel, and then also analyzed during a time when the probe signal is not transmitted to determine the strength (e.g. RSSI) of the noise and/or interference in the channel. As discussed previously, sympathetic multipath propagation enhances the strength of the received signal, and various embodiments of the present subject matter rapidly update channel information to take advantage of sympathetic multipath propagation by using only those frequencies that have sympathetic responses to multipath signals. By analyzing the signal strength of N+I, it can be determined whether noise or interference contributed to the detected signal strength. A channel map may be enhanced to avoid interference signals. The channel map used in an adaptive frequency hopping scheme may be used to identify a combination of channels exhibiting good multipath characteristics and low interference and noise. Thus, a channel can be selected based at least in part on both the signal strength of the probe signal such as to select a channel or channels exhibiting sympathetic multipath propagation, and the strength of the noise and interference. FIGS. 15-17, discussed below, provide additional examples for using N+I signal strength. For example, various embodiments of a wireless communication system may use variable power levels based on channel quality metrics. Some embodiments may use link quality metrics to control transmit RF power of devices and some embodiments may use link quality metrics to control receiver input power consumption (e.g. receiver gain/linearity). Some embodiments may use various symbol rates based on channel quality metrics. For example, some embodiments may employ lower/higher symbol rates based on one or more channel metrics to improve the link margin of the overall system. At any time during a communication session, the system may change symbol rates based on channel metrics used to assess link quality. Some embodiments may use various packet lengths based on channel quality metrics. Various embodiments of a wireless communication system may use diverse antenna(s), and control the polarization of the diverse antenna(s) based on channel quality metrics. In an indoor environment there are many sources of radio frequency reflections that cause multi-path signal arrivals at the antenna that may cause fading of the channel which effect the bit error rate or packet error rate of the system. A diversity antenna system employing both polarization and special diversity can help to enhance the link. By employing a diversity antenna, the system improves the chances of intercepting a signal from the ceiling, floor, or nearby wall that is not impaired by body shadowing effects or even other interference. However, it is noted that one of the benefits of the present subject matter is that it is quickly able to analyze a multipath environment and select an appropriate channel accordingly to provide a channel that has the largest RSSI. This ability to accommodate to the dynamically changing multipath environment may be used to reduce the size and requirements of the antenna system.

Figure 12:
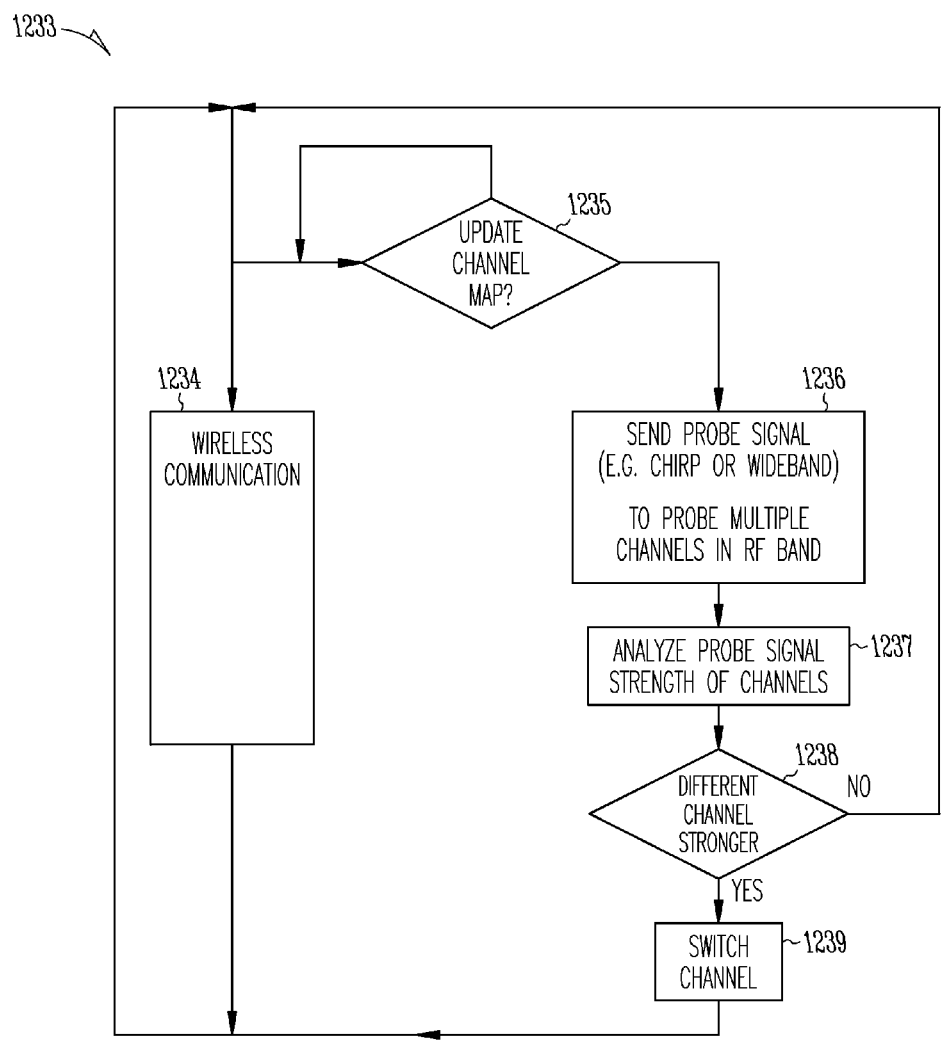
FIG. 12 illustrates an example of a process for wirelessly communicating over a channel, probing wireless channels in the band, and selecting a communication channel based on the signal strength of the probe.

FIG. 12 illustrates an example of a process for wirelessly communicating over a channel, probing wireless channels in the band, and selecting a communication channel based on the signal strength of the probe. The illustrated process 1233 indicates that the wireless communication 1234 may continue as the channel map is updated in parallel. The wireless communication is performed on a selected wireless channel. When it is time to update a channel map, as illustrated at 1235, the process may send a probe signal to probe multiple channels in the RF band 1236. Examples of probe signal pulses include a chirp pulse or a wideband pulse. The probe signal strengths for the channels are identified and analyzed 1237. If a different communication channel has a stronger received signal strength (e.g. RSSI), as identified at 1238, the process may then switch the selected communication channel to a new channel 1239, and continue to wirelessly communicate using the new channel. It is understood that determining the strongest RSSI of the signal as generally illustrated in 1238 is an example. Another example analyzes the RSSI of the interference to determine the strongest C/(N+I) channel or set of channels used in an adaptive frequency hopping scheme.

Figure 13:
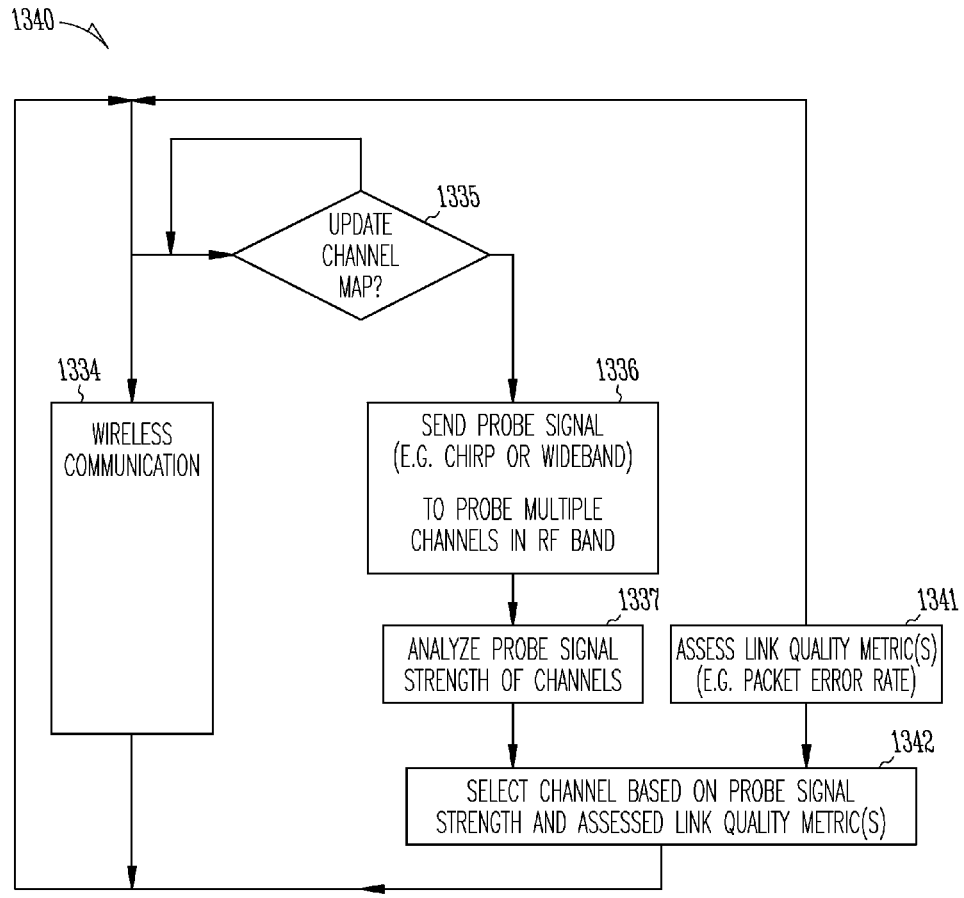
FIG. 13 illustrates an example of a process for wirelessly communicating over a channel, probing wireless channels in the band, analyzing link quality of communication, and selecting a communication channel based on the signal strength of the probe and the analyzed link quality.

FIG. 13 illustrates an example of a process for wirelessly communicating over a channel, probing wireless channels in the band, analyzing link quality of communication, and selecting a communication channel based on the signal strength of the probe and the analyzed link quality. Similar to FIG. 12, the illustrated process 1340 indicates that the wireless communication 1334 may continue as the channel map is updated in parallel. The wireless communication is performed on a selected wireless channel. When it is time to update a channel map, as illustrated at 1335, the process may send a probe signal to probe multiple channels in the RF band 1336. Examples of probe signal pulses include a chirp pulse or a wideband pulse. The probe signal strengths for the channels are identified and analyzed 1337. Additionally, link quality metrics of the current communication channel may be updated 1341. The system may maintain a link quality metric for all of the channels and continue to update these metrics as these channels are used. At 1342, a new communication channel may be selected based on the probe signal strength and the assessed link quality metrics. The system may continue to wirelessly communicate using the new channel. It is understood that determining the probe signal strength is an example. Another example may analyze the channel signal strength to interference ratio (C/I) or may analyze the carrier (C)-to-noise (N)-and-interference (I) ratio to identify the strongest C/(N+I) channel or to remove channels with poor C/(N+I) characteristics from a set of channels used in an adaptive frequency hopping scheme.

Figure 14:
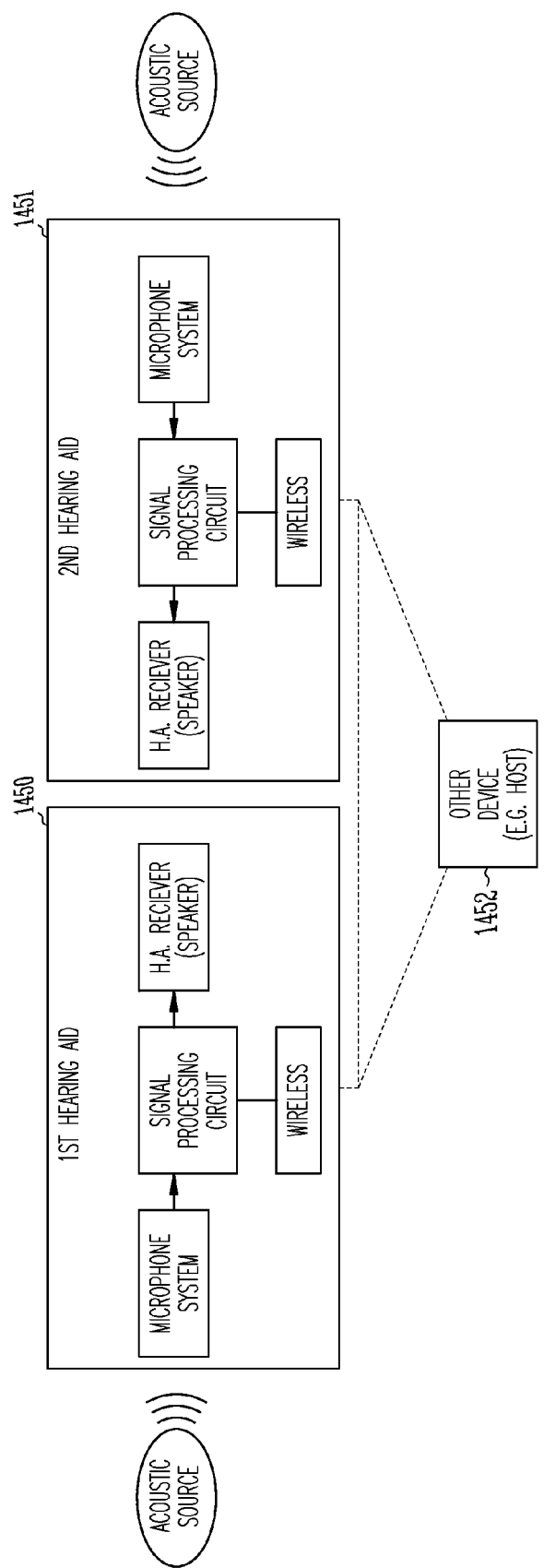
FIG. 14 illustrates, by way of example and not limitation, a wireless hearing aid system.

FIG. 14 illustrates, by way of example and not limitation, a wireless hearing aid system. The illustrated hearing aid system may include one or more hearing aids 1450, 1451, and/or may include another device such as a host device 1452. The other device may be, by way of example and not limitation, a programmer or a wireless audio controller (WAC). An embodiment of a wireless system with a wireless audio controller (WAC) and at least one hearing assistance device. US 2006/0274747, entitled COMMUNICATION SYSTEM FOR WIRELESS DEVICES, and U.S. Ser. No. 11/619,541 entitled WIRELESS SYSTEM FOR HEARING COMMUNICATION DEVICE PROVIDING WIRELESS STEREO RECEPTION MODES, both of which are incorporated herein in their entirety, include examples of WACs. A WAC may be connected to a network (e.g. Internet, LAN, WAN, cellular) through which data (e.g. compressed audio data) is communicated to the WAC. The illustrated WAC is also configured to wirelessly communicate with at least one other device such as at least one hearing assistance device.

The illustrated system in FIG. 14 includes two hearing aids. The features of the present subject matter can be used in a variety of hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in prescriptive or non-prescriptive hearing assistance devices generally, such as cochlear implant type hearing devices and such as deep insertion devices having a transducer, such as a receiver or microphone, whether custom fitted, standard, open fitted or occlusive fitted. The present subject matter may be implemented in eyeglass mount, implants, and body worn hearing aids, and further can be used in noise-protection earphones, headphones, and the like. It is understood that other hearing assistance devices not expressly stated herein may be used in conjunction with the present subject matter.

The microphone system transforms the acoustic energy of sound from an acoustic source into a signal representative of the sound. The signal processing circuit receives the signal from the microphone system, and is designed (e.g. programmed) to appropriately adjust the signal to compensate for the hearing impairment of the wearer of the hearing aid. The signal processing circuit outputs a processed signal to the hearing aid receiver, which converts the processed electrical signal into a sound perceived by the wearer. The illustrated hearing aid embodiment also includes a wireless communication circuit adapted to transmit and/or receive wireless signals. The wireless communication circuit may include a receiver, a transmitter, or a transceiver. The signal processing circuit (or controller) controls the wireless communication circuit to control the wireless communication with other devices.

As illustrated by the dotted lines, the device 1452 may be adapted to wireless communicate with both hearing aids 1450, 1451, the first hearing aid 1450 is adapted to wirelessly communicate with the second hearing aid 1451 and the device 1452, and the second hearing aid 1451 may be adapted to wirelessly communicate with the first hearing aid 1450 and the device 1452. The communication signals may include data and/or audio. Examples of data include programming instructions, device diagnostics, and link quality information. Examples of audio include digital audio or compressed digital audio. By way of example and not limitation, the hearing aids may be configured to operate using 900 MHz or 2.4 GHz wireless technology. The devices may be designed to operate in another frequency band(s) of interest.

The assessed link quality referenced earlier discussed N+I measurements. FIGS. 15-17 provide additional examples for using N+I signal strength.

FIG. 15 illustrates an example of a system to select channel(s). The illustrated system includes a processor 1553 with a channel map 1554 and a programmed channel selection algorithm 1555. The processor 1553 may also include a sampler 1556 for sampling the N+I strength for the channels during times without the probe signal, as well as a module 1557 for determining the wideband probe signal strength. The sampler may provide N+I statistics for the channels, and the channel map may be updated with data regarding the both the probe signal strength and the N+I strength for the channels. The N+I sampling and updating of the channel map may be performed as a background task. Different wireless communication applications may have different application requirements 1558. For example, some applications may require certain power limitations, or may require certain packet error rates (PER), or may require a certain margin between a carrier signal (C) and N+I. This information may be programmed or otherwise stored in memory accessible by the processor. The channel selection algorithm may search the channel map for channels that satisfy the application requirements, and output a channel or channels which may be used for communication.

The N+I measurements are statistical in nature. For example, an interfering source may not be constantly sending an interfering signal. The probe response signal strength compared to the statistical properties of N+I, when looked at on a channel by channel basis will yield a channel or channels that provide adequate communications signal quality.

FIG. 16 illustrates an example of a table populated with statistical information for the sampled N+I strengths. The columns represent different channels, and the rows illustrate different percentages. Each cell represents a N+I signal strength measurement in dBm. Larger negative numbers represent lower signal strength measurements. Thus, a −90 dBm signal strength is lower than a −80 dBm signal strength. By way of example, channel 3 indicates that all of the samples have a N+I strength of −53 dBm or lower, 80% of the samples have a N+I strength of −75 dBm or lower, 60% of the samples have a N+I strength of −84 dBm or lower, 40% of the samples have a N+I strength of −90 dBm or lower, and 20% of the samples have a N+I strength of −95 dBm or lower. By way of example and not limitation, if the application requirements allow packet retransmissions 20% of the time (e.g. 20% packet error rate or PER), and if a 15 dB margin is required between the carrier signal strength and the N+I strength, and if the signal strength of the carrier is −65 dBm, then the channel selection algorithm may allow channels to be used that have a N+I strength of −80 dBm or less 80% of the time. Channels 1 and 4-10 indicate that channels that have a N+I strength of −80 dBm or less 80% of the time. If the communication application is communicating data that can accommodate more retransmission attempts, then the channel selection algorithm may look require that a lower percentage of samples have a lower noise and interference. Other applications may not be able to accommodate as many retransmission attempts, and thus may require that a higher percentage of samples have the lower noise and interference. Examples of such applications include audio and other isochronous applications.

Some embodiments may control the power of the transmitted carrier signal based on the received power of the carrier signal and the N+I signal. For example, if a 15 dBm margin is to be maintained and the application can accommodate 20% retransmissions, then the system recognizes that the received probe signal strength of −65 dBm is larger than necessary, and may reduce the transmitted power so that the received probe signal strength is about −75 dBm. Channels 1 and 5-8 still provide the designed margin 80% of the time (i.e. the N+I strength is −90 dBm or lower 80% of the time).

The table illustrated in FIG. 15 may include many more channels and may include many more rows to represent different percentages to provide more granularity to the data. The values of the measured N+I strength for the different channels may identify the frequencies of interfering sources. FIG. 17, for example, illustrates a pattern of sensed noise across many channels that may be identified by a table populated with statistical information for the sampled N+I strengths. One of the lines represents the −97.5 dBm level and the other represents the −90 dBm level. The pattern indicates the presence of three frequency ranges with interference. The present system may identify these regions and avoid them in selecting the communication channel(s).

Those of ordinary skill in the art will understand that such a system, with wireless devices worn by a person, will be susceptible to fast changes in an indoor, multipath propagation environment. Simple head motion can significantly change the strength of the multipath signals, as well as the paths themselves. Such wireless devices worn by a person may be referred to as a wearable device, wearable technology, fashion electronics, or wearable computer, for example. Examples of such devices may include watches and glasses.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system, comprising:
a first device and a second device configured to communicate over a selected wireless communication channel selected from a band of channels or over a selected set of channels used in an adaptive frequency hopping scheme;
the first device configured to transmit a probe signal that has a plurality of frequencies contained within the band of channels;
the second device configured to receive the probe signal that has the plurality of frequencies within the band of channels, and then determine a signal strength of the received probe signal for each of a plurality of potential communication channels within the band of channels; and
the first and second devices configured to switch to another wireless communication channel or set of channels based at least in part on the signal strength of the probe signal for each of a plurality of potential wireless communication channels.

2. The system of claim 1, wherein the second device is further configured to determine a signal strength of noise (N) and interference (I) for each of the plurality of potential communication channels within the band of channels during a time when the first device does not transmit signals, the first and second devices configured to switch to another wireless communication channel based at least in part on both of the signal strength of the probe signal and the signal strength of noise (N) and interference (I) for each of a plurality of potential wireless communication channels.

3. The system of claim 2, wherein the second device is configured to sample the signal strength of noise (N) and interference (I) for each of the plurality of potential communication channels during times when the first device does not transmit signals, and to compile and update N+I statistics from the samples for the plurality of potential communication channels, the first and second devices configured to switch to another wireless communication channel or set of channels based at least in part on the N+I statistics.

4. The system of claim 1, wherein the first and second devices are configured to communicate over the selected wireless communication channel while the probe signal is transmitted and the signal strength of the probe signal is determined for each of the plurality of potential communication channels within the band of channels.

5. The system of claim 1, wherein the first device is configured to transmit a chirp signal, the chirp signal being a frequency modulated pulse.

6. The system of claim 1, wherein the first device is configured to transmit a wideband signal that has frequencies corresponding to a plurality of channels within the band of channels.

7. The system of claim 1, wherein the first device is configured to transmit a signal that has a substantially uniform strength for a plurality of channels within the band of channels.

8. The system of claim 1, the first and second devices are configured to switch to another wireless communication channel that has a signal strength enhanced by sympathetic multipath propagation.

9. The system of claim 1, wherein the band of channels includes a first sub-band of channels and a second sub-band of channels, and the first device is configured to transmit a first probe signal that has a first range of frequencies corresponding to the first sub-band of channels and transmit a second probe signal that has a second range of frequencies corresponding to the second sub-band of channels.

10. The system of claim 1, wherein the first and second devices are configured to communicate within a 900 MHz band or are configured to communicate within a 2.4 GHz band.

11. The system of claim 1, wherein at least one of the first and second devices include a hearing assistance device.

12. The system of claim 1, wherein at least one of the first and second devices includes a wearable device configured to be worn by a user.

13. A method, comprising:
communicating over a selected wireless communication channel selected from a band of channels;
transmitting a probe signal that has a plurality of frequencies contained within the band of channels;
receiving the probe signal that has the plurality of frequencies contained within the band of channels, and then determining a signal strength of the received probe signal for each of a plurality of potential wireless communication channels within the band of channels; and
switching to another wireless communication channel based at least in part on a carrier signal (C) strength for the probe signal for each of a plurality of potential wireless communication channels.

14. The method of claim 13, wherein switching includes switching to another wireless communication channel based at least in part on both the carrier signal (C) strength for the probe signal and the signal strength of noise (N) and interference (I).

15. The method of claim 14, further comprising sampling the signal strength of noise (N) and interference (I) for each of the plurality of potential wireless communication channels during times when the probe signal is not transmitted, and compiling and updating N+I statistics from the samples, wherein switching includes switching to another wireless communication channel based at least in part on both the carrier signal (C) strength for the probe signal and the N+I statistics.

16. The method of claim 13, wherein transmitting the probe signal and determining the signal strength of the probe signal for each of a plurality of potential wireless communications channels occur while communicating over the selected wireless communication channel or set of channels.

17. The method of claim 13, wherein transmitting the probe signal includes transmitting a chirp signal, the chirp signal being a frequency modulated pulse.

18. The method of claim 17, wherein the chirp signal includes:
an up-chirp pulse for which a frequency increases from a lower frequency value at a beginning of the up-chirp pulse to a higher frequency value at an end of the up-chirp pulse; or
a down-chirp pulse for which a frequency decreases from a higher frequency value at a beginning of the down-chirp pulse to a lower frequency value at an end of the down-chirp pulse.

19. The method of claim 13, wherein transmitting the probe signal includes transmitting a wideband signal that has frequencies corresponding to a plurality of channels within the band of channels.

20. The method of claim 13, wherein transmitting the probe signal includes transmitting a signal that has a substantially uniform strength for a plurality of channels within the band of channels.

21. The method of claim 13, wherein switching to another wireless communication channel based at least in part on the signal strength of the probe signal for each of a plurality of potential wireless communication channels includes selecting a new wireless communication channel having a signal strength enhanced by sympathetic multipath propagation.

22. The method of claim 13, wherein the band of channels includes a first sub-band of channels and a second sub-band of channels, and transmitting the probe signal that has a plurality of frequencies contained within the band of channels includes transmitting a first probe signal that has a first range of frequencies corresponding to the first sub-band of channels and transmitting a second probe signal that has a second range of frequencies corresponding to the second sub-band of channels.

23. The method of claim 13, wherein communicating over a selected wireless communication channel includes communicating within a 900 MHz band or communicating within a 2.4 GHz band.

* * * * *